United States Patent Office 3,210,364
Patented Oct. 5, 1965

3,210,364
PROCESS FOR PRODUCING BIPYRIDYLS
Alastair Campbell, Widnes, England, assignor to Imperial Chemical Industries Limited, Millbank, London, England, a corporation of Great Britain
No Drawing. Filed Sept. 6, 1962, Ser. No. 221,901
Claims priority, application Great Britain,
Sept. 12, 1961, 32,713/61
10 Claims. (Cl. 260—296)

This invention relates to an oxidation process for the manufacture of organic bases, more particularly 4:4'-bipyridyl.

4:4'-bipyridyl is a valuable intermediate for the manufacture of herbicidal products and is commonly made, in conjunction with varying proportions of isomeric materials, by oxidation of the product obtained by interaction of sodium and pyridine. An alternative method, described in U.S. application Serial No. 193,627, filed May 9, 1962, is that of oxidising the interaction product of magnesium and pyridine. In both these methods, it has been the usual practice hitherto to oxidise the metal-pyridine interaction product with air or oxygen, since this affords a cheap method and also has been regarded as a suitable way of controlling the vigorous oxidation reaction.

Oxidation by a gaseous oxidising agent has several disadvantages, however, including in particular the explosion and fire hazard which arises from the formation of hot mixtures containing oxygen and organic vapours (for example from the hydrocarbon diluents employed) in the reaction vessels. This hazard is increased by the possible presence of finely divided metal. Furthermore, the large volume of nitrogen associated with the oxygen, or added to reduce fire hazard, reduces the efficiency of the condensers used in the process.

According to the present invention there is provided an improved process for the manufacture of bipyridyls wherein a metal-pyridine interaction product is treated with a hypochlorite.

The reaction which takes place is vigorous but, surprisingly, is very readily controlled and does not lead to additional formation of undesired by-products from the pyridine. The yield of bipyridyls is good and the disadvantages of the earlier oxidation methods are avoided without loss of yield of product. Also, the products to which the hypochlorite is converted during the reaction are substantially all gaseous or water-soluble and so are very readily eliminated in subsequent isolation procedures.

The metal-pyridine interaction product may be in particular a sodium-pyridine interaction product, which may be prepared in known manner by mixing finely divided sodium with the pyridine in an inert diluent for example xylene or petroleum spirit. Other alkali metals, for example potassium and lithium, may also be used in place of sodium, though these are less convenient and accessible. There may also be used a magnesium-pyridine interaction product, which may be prepared in the manner described in said co-pending U.S. application Serial No. 193,627 by interacting magnesium metal with the pyridine, preferably in the presence of a small proportion of an initiator which may be in particular a material which can induce the formation of free radicals in the magnesium-pyridine mixture for example iodine, bromine, or finely divided sodium or potassium. There may also be used an aluminium-pyridine interaction product, which may be prepared by interacting aluminum metal with pyridine preferably in the presence of an initiator for example a material which can initiate a magnesium-pyridine interaction and/or a material which can clean the metal by breaking down the surface oxide film (particularly a mercury compound, for example mercuric chloride).

The pyridine used in the formation of the metal-pyridine interaction product should be as free as possible from any substituent or impurity (for example piperidine) which can take part in any undesirable side-reaction with the metal (or the initiator, when one is used). The process of my invention is especially applicable to interaction products derived from pyridine itself. Pyridines containing hydrocarbon radicals (particularly alkyl radicals, for example methyl and/or ethyl radicals) may also be used, for example picolines and lutidines; as these are less reactive than pyridine itself, however, they are better used as alkali metal interaction products.

Commonly a mixture of isomeric bipyridyls is produced by the process of the present invention, the principal constituents being the 2:2'-, 2:4'- and 4:4'-isomers or such of these as are permitted by the structure of the pyridine used as starting material in making the metal-pyridine interaction product. The 4:4'-isomer usually predominates.

The hypochlorite may be any hypochlorite, but especially one which is readily soluble in water, such as an alkali metal or alkaline earth metal hypochlorite. Sodium hypochlorite is to be preferred on account of its ready availability and cheapness, but potassium hypochlorite and calcium hypochlorite may also be used if desired. Bleaching powder may also be used as a source of hypochlorite, and is most conveniently employed in the form of an aqueous extract or slurry. It is not critical for the purposes of the present invention whether or not the hypochlorite contains excess alkali or other material which is commonly present in commercial hypochlorites. The hypochlorite is preferably used in the form of an aqueous solution, on account of the greater stability of the material and ease of addition to the reaction mixture, but the concentration of hypochlorite in such solutions is not critical and solutions of any convenient strength may be used, with or without dilution.

In general the proportion of hypochlorite should be at least 0.2 mole, and preferably between 0.25 and 0.5 mole, for each equivalent of metal used in making the metal-pyridine interaction product. Larger proportions may be used if desired, but some attack on unreacted pyridine may occur at elevated temperatures if a substantial excess of hypochlorite is used and this may reduce the amount of unchanged pyridine which can be recovered for re-use.

The hypochlorite reacts immediately and the vigorous reaction can readily be controlled by adding the hypochlorite at such a rate that the reaction is maintained. Most conveniently, the reaction may be carried out in reflux apparatus, the hypochlorite being added gradually to the stirred reaction mixture at such a rate that the mixture boils steadily and the condensing system is not overloaded.

The isolation of bipyridyls from the reaction mixture can be carried out by conventional techniques, for example fractional distillation, extraction with acid and treatment of the acid extracts with alkali, fractional crystallisation, and combinations of such techniques. The mixture of isomeric bipyridyls may be used as such, or may be separated by the known methods in order to obtain individual isomers, particularly 4:4'-bipyridyl, in a substantially pure state.

The process of the present invention has the advantage of rapid smooth and complete reaction while retaining ease of control. This is especially important in commercial operation, as production from a given installation can be increased and the process is suitable for continuous operation. Moreover, the explosion and fire hazard are very greatly reduced because the large volumes of gaseous oxidising medium previously required are now avoided and the reaction can be carried out in an inert atmosphere, for example under nitrogen. The losses of material and the cost of refrigeration, resulting from the large flow of gases in the prior art processes, are also largely eliminated, and the cost and complexity of the isolation procedure is greatly reduced by the fact that most of the inorganic by-products are in gaseous or water-soluble form.

The bipyridyls are useful as intermediates in chemical synthesis and in the manufacture of herbicidal products.

The invention is illustrated but not limited by the following examples in which the parts and percentages are by weight.

*Example 1*

50 parts of sodium metal, in the form of a dispersion in trimethylbenzene containing 33% by weight of sodium metal, were added with stirring to 943 parts of pyridine during a period of 111 minutes, while the temperature of the mixture was maintained in the range 89° C. to 99° C. and an atmosphere of nitrogen was maintained in the reaction vessel. The mixture wa stirred for 30 minutes more, and was then oxidised by addition of 74.3 parts of an aqueous 15% solution of sodium hypochlorite during a period of 76 minutes, while the temperature of the reaction mixture was maintained in the range 35° C. to 66° C. The atmosphere of nitrogen in the reaction vessel was maintained throughout this procedure.

The resulting product (1210 parts) contained 56.4% pyridine, 6.7% of 4:4'-bipyridyl and 0.5% of 2:4'-bipyridyl. The yield of bipyridyls was 33.3% of theory, based on the pyridine consumed.

*Example 2*

58.4 parts of sodium metal, in the form of a dispersion in trimethylbenzene containing 35% by weight of sodium metal, were added with stirring to 943 parts of pyridine during a period of 113 minutes, while the temperature of the mixture was maintained in the range 84° C. to 102° C. and an atmosphere of nitrogen was maintained in the reaction vessel. The mixture was then stirred for 30 minutes more, and was then oxidised by addition of a slurry of 42.5 parts of bleaching powder in 59.5 parts of water at such a rate that the temperature of the reaction mixture remained below 35° C. The atmosphere of nitrogen in the reaction vessel was maintained throughout this procedure.

The resulting product (1269 parts) contained 51.9% of pyridine, 7.6% 4:4'-bipyridyl and 0.6% 2:4'-bipyridyl, The yield of bipyridyls was 36.7% of theory, based on the pyridine consumed.

*Example 3*

A mixture of magnesium turnings (36.4 parts, 1.5 mole), pyridine (1264 parts, 16 mole) and sodium (0.5 part) was refluxed in atmosphere of nitrogen for 6 hours, and the reaction mixture was then oxidised by gradual addition of 120 parts of an aqueous 15% solution of sodium hypochlorite during a period of 30 minutes. The product was then cooled and filtered to remove insoluble inorganic constituents. These insoluble inorganic constituents were washed with trimethylbenzene, the solids were discarded, and the washings were combined with the main filtrate and fractionated. There were thus obtained 945 parts of pyridine, 2.3 parts of 2:4'-bipyridyl and 136 parts of 4:4'-bipyridyl. The yield of bipyridyls was 43.7% of theory based on the pyridine consumed.

*Example 4*

100 parts of pyridine were stirred and boiled under reflux conditions with 13.5 parts of a powdered alloy containing 50% aluminium and 50% magnesium, and then 1 part of a dispersion of sodium in trimethylbenzene (containing 33% of sodium metal) was added together with 0.5 part of magnesium turnings. Refluxing of the mixture was continued for 5 hours, after which time a further 50 parts of pyridine were added to the resulting thick mixture and refluxing was continued for a further 3 hours.

A further 50 parts of pyridine were then added to reduce the viscosity of the mixture, which was then cooled to 80° C. and maintained at this temperature while 54.6 parts of an aqueous 15% solution of sodium hypochlorite was added gradually. The whole operation was carried out with an atmosphere of nitrogen in the reaction vessel.

The resulting product (260 parts) was found by analysis to contain 65.6% pyridine, 0.4% 2:2'-bipyridyl, 0.4% 2:4'-bipyridyl and 8.6% 4:4'-bipyridyl. The yield of bipyridyls was 83% of theory based on the pyridine consumed.

*Example 5*

100 parts of pyridine were boiled and stirred under reflux conditions in an atmosphere of nitrogen with 5 parts of aluminium foil, and to this were added 1 part of a dispersion of sodium in trimethylbenzene (containing 33% of sodium metal), 0.25 part of magnesium turnings and 0.25 part of a powdered alloy consisting of 50% aluminium and 50% magnesium. The mixture rapidly became dark. Refluxing of the mixture was continued for 90 minutes and then a further 50 parts of pyridine were added to reduce the viscosity of the mixture, followed by another 50 parts of pyridine 45 minutes later and another 50 parts of pyridine when the refluxing had been continued for a total of 5 hours. The mixture was then cooled to 60° C. and maintained at this temperature while 15 parts of an aqueous 15% solution of sodium hypochlorite were added. The product (268 parts) contained 84.8% pyridine, 0.1% 2:2'-bipyridyl and 3.9% 4:4'-bipyridyl. The yield of bipyridyl was 46% of theory based on the pyridine consumed.

What I claim is:

1. Process for the manufacture of bipyridyls selected from the group consisting of unsubstituted bipyridyls and the alkyl derivatives thereof, which comprises treating with a hypochlorite a metal-pyridine interaction product obtained by reaction of a metal and a compound selected from the group consisting of pyridine itself and alkyl-substituted pyridine.

2. Process as claimed in claim 1 wherein said compound is pyridine.

3. The process for the manufacture of an unsubstituted bipyridyl which comprises adding sodium metal dispersed in trimethylbenzene to pyridine at a temperature up to the boil, thereafter oxidizing the resulting sodium-pyridine reaction product by adding thereto an aqueous solution of sodium hypochlorite while maintaining the resulting reaction mixture at a temperature in the range of 35–66° C., the proportion of hypochlorite being between 0.25 and 0.5 mole for each equivalent of sodium used in preparing the sodium-pyridine reaction product, and an atmosphere of nitrogen being maintained throughout the sodium-pyridine reaction and the subsequent oxidation, and then recovering the desired bipyridyl from the reaction mixture.

4. Process as claimed in claim 1 wherein the hypochlorite is used in the form of an aqueous solution.

5. Process as claimed in claim 1 wherein the hypochlorite is sodium hypochlorite.

6. Process as claimed in claim 1 wherein the proportion of hypochlorite used is at least 0.2 mole for each equivalent of metal used in making the metal-pyridine interaction product.

7. Process as claimed in claim 6 wherein the proportion of hypochlorite is between 0.25 and 0.5 mole for each equivalent of metal used in making the metal-pyridine interaction product.

8. Process as claimed in claim 1 wherein the metal-pyridine interaction product is a sodium-pyridine interaction product.

9. Process as claimed in claim 1 wherein the metal-pyridine interaction product is a magnesium-pyridine interaction product.

10. Process as claimed in claim 1 wherein the metal-pyridine interaction product is an aluminium-pyridine interaction product.

References Cited by the Examiner

UNITED STATES PATENTS 2,773,060  12/56  Linnell et al. _____ 260—296

FOREIGN PATENTS 870,700  6/61  Great Britain.

WALTER A. MODANCE, *Primary Examiner.*

NICHOLAS S. RIZZO, *Examiner.*